(12) United States Patent
Demmelhuber et al.

(10) Patent No.: US 11,473,757 B2
(45) Date of Patent: Oct. 18, 2022

(54) ILLUMINATION DEVICE FOR ILLUMINATING A REGION MONITORED BY AT LEAST ONE IMAGE SENSOR

(71) Applicant: B&R INDUSTRIAL AUTOMATION GMBH, Eggelsberg (AT)

(72) Inventors: Hermann Demmelhuber, Eggelsberg (AT); Andreas Waldl, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/678,062

(22) Filed: Nov. 8, 2019

(65) Prior Publication Data
US 2020/0149709 A1 May 14, 2020

(30) Foreign Application Priority Data
Nov. 9, 2018 (EP) ..................... 18205427

(51) Int. Cl.
| | | |
|---|---|---|
| F21V 14/02 | (2006.01) | |
| F21V 21/30 | (2006.01) | |
| F21V 23/00 | (2015.01) | |
| F21V 23/04 | (2006.01) | |
| F21Y 105/16 | (2016.01) | |
| F21Y 115/10 | (2016.01) | |
| F21W 131/403 | (2006.01) | |

(52) U.S. Cl.
CPC .............. *F21V 14/02* (2013.01); *F21V 21/30* (2013.01); *F21V 23/003* (2013.01); *F21V 23/0492* (2013.01); *F21W 2131/403* (2013.01); *F21Y 2105/16* (2016.08); *F21Y 2115/10* (2016.08)

(58) Field of Classification Search
CPC ........ F21V 14/02; F21V 21/30; F21V 14/025; F21V 19/02; F21V 14/06; F21V 14/065; H05B 47/125
USPC ............. 362/271, 272, 286, 287; 47/58.1 LS
See application file for complete search history.

(56) References Cited

U.S. PATENT DOCUMENTS

| | | | | |
|---|---|---|---|---|
| 5,023,709 A | * | 6/1991 | Kita ......................... | G01S 17/66 348/172 |
| 6,059,421 A | * | 5/2000 | White ................ | G01N 21/8806 362/33 |
| 6,079,862 A | * | 6/2000 | Kawashima ......... | H05B 47/125 382/103 |

(Continued)

FOREIGN PATENT DOCUMENTS

| | | |
|---|---|---|
| AT | 518 832 | 1/2018 |
| EP | 2 843 303 | 3/2015 |

OTHER PUBLICATIONS

Europe Search Report/Office Action conducted in counterpart Europe Appln. No. 182 05 427.0 (dated Apr. 16, 2019) (w/ partial machine translation).

*Primary Examiner* — Jong-Suk (James) Lee
*Assistant Examiner* — James M Endo
(74) *Attorney, Agent, or Firm* — Greenblum & Bernstein, P.L.C.

(57) ABSTRACT

An illumination device for illuminating a region monitored by at least one image sensor. The illumination device has at least one light source carrier with at least one light source arranged thereon. Furthermore, the illumination device has a control and interface unit and an adjusting unit, which can be actuated by the control and interface unit and with which the light source carrier is positionally adjustable.

20 Claims, 4 Drawing Sheets

(56) References Cited

U.S. PATENT DOCUMENTS

| | | | | |
|---|---|---|---|---|
| 6,547,410 B1* | 4/2003 | Pederson | ............ | B60Q 1/2611 362/272 |
| 6,944,324 B2* | 9/2005 | Tran | .................. | G06T 7/0004 382/101 |
| 7,431,483 B1* | 10/2008 | Lee | ..................... | F21V 14/02 362/423 |
| 8,031,227 B2* | 10/2011 | Neal | ..................... | G01S 5/16 348/169 |
| 8,201,974 B1* | 6/2012 | Smith | .................. | F21V 21/30 362/257 |
| 9,794,462 B2* | 10/2017 | Zosel | .................. | F21V 11/02 |
| 10,045,423 B2* | 8/2018 | Kao | ..................... | H05B 47/125 |
| 2005/0243549 A1* | 11/2005 | Ruston | .................. | F21S 2/00 362/233 |
| 2006/0197840 A1* | 9/2006 | Neal | ..................... | G01S 5/16 348/169 |
| 2009/0091444 A1* | 4/2009 | Hierzer | ............... | H05B 45/00 340/541 |
| 2010/0200753 A1* | 8/2010 | Westaway | ............ | F21V 17/02 250/338.1 |
| 2010/0259931 A1 | 10/2010 | Chemel et al. | | |
| 2010/0301769 A1* | 12/2010 | Chemel | .................. | F21V 29/63 315/294 |
| 2011/0115969 A1* | 5/2011 | Whillock | ............ | H04N 5/2256 348/370 |
| 2012/0019665 A1* | 1/2012 | Toy | .................. | H04N 5/23299 348/169 |
| 2012/0020098 A1* | 1/2012 | Lee | ..................... | F21V 19/02 362/419 |
| 2012/0057333 A1* | 3/2012 | Bhardwaj | ............... | F21L 13/06 362/183 |
| 2012/0112640 A1* | 5/2012 | Maxik | .................. | H05B 45/18 315/152 |
| 2012/0134155 A1 | 5/2012 | Wendt et al. | | |
| 2013/0043788 A1* | 2/2013 | O'Brien | ..................... | F21S 2/00 315/112 |
| 2014/0012400 A1* | 1/2014 | Hidaka | ................ | H05B 47/105 700/28 |
| 2015/0003084 A1* | 1/2015 | Eichel | ..................... | F21V 21/14 362/419 |
| 2015/0035437 A1* | 2/2015 | Panopoulos | ............ | F21V 14/02 315/112 |
| 2015/0062902 A1* | 3/2015 | Velazquez | ............... | F21V 21/15 362/249.07 |
| 2015/0308642 A1* | 10/2015 | Vo | ..................... | F21V 21/30 362/648 |
| 2015/0345762 A1* | 12/2015 | Creasman | ............... | F21V 21/30 362/428 |
| 2016/0286732 A1* | 10/2016 | Wu | ..................... | A01G 9/20 |
| 2017/0038046 A1 | 2/2017 | Bardot | | |
| 2017/0155813 A1* | 6/2017 | Waldl | .................. | H05B 45/18 |
| 2017/0161915 A1* | 6/2017 | Walma | ................ | H05B 47/105 |
| 2017/0184289 A1* | 6/2017 | Nolan | .................... | G01C 19/02 |
| 2017/0244934 A1* | 8/2017 | Chien | .................... | H04N 7/183 |
| 2017/0347073 A1* | 11/2017 | Shimizu | ..................... | F21S 8/00 |
| 2018/0020522 A1* | 1/2018 | Rogers, III | ............ | H05B 47/22 |
| 2018/0051869 A1 | 2/2018 | Belliveau et al. | | |
| 2018/0292809 A1* | 10/2018 | Farnik | ..................... | F21V 21/15 |

\* cited by examiner

ILLUMINATION DEVICE FOR ILLUMINATING A REGION MONITORED BY AT LEAST ONE IMAGE SENSOR

CROSS-REFERENCE TO RELATED APPLICATIONS

The present application claims priority under 35 U.S.C. § 119(a) of Europe Patent Application No. 18 20 5427.0 filed Nov. 9, 2018, the disclosure of which is expressly incorporated by reference herein in its entirety.

BACKGROUND

1. Field of the Invention

The present invention relates to an illumination device for illuminating a region monitored by at least one image sensor, wherein the illumination device has at least one light source carrier with at least one light source arranged thereon. Furthermore, the invention relates to a modular lighting system and an image acquisition system for use in a machine vision system.

2. Discussion of Background Information

For the illumination of regions that are monitored with image sensors, in particular with machine-vision cameras (MV cameras), illumination devices are desired that ensure the most homogeneous possible illumination.

For this example, linear, beam and/or ring lights can be used, which have an arrangement of a plurality of high-power LEDs arranged generally parallel to each other. For many industrial applications, such lights must be precisely set to a region to be illuminated, something that is usually done manually. Usually the orientation is adjusted by more or less systematic trial and error until an optimal position is found. This is then generally no longer changed. This process is not only time consuming, but also very inaccurate. For example, it is almost impossible to manually set multiple beam lights to an identical angle. If the lighting arrangement has to be changed due to changed specifications, the entire adjustment process must also be repeated.

Another problem arises in the prior art if the homogeneity of the illumination changes over time. This may be the case, for example, when the wavelength of the light sources (regulated or due to temperature changes and/or aging) changes. As a result, the (frequency-dependent) refractive index in particular also changes, so that the emission angle of the light source changes. This effect occurs relatively intensely, for example, in high-power LEDs which are embedded in a lens body. However, the homogeneity of the illumination can also change if, for example, the illumination device has moved out of its original position due to vibrations.

SUMMARY

Embodiments of the present invention provide an illumination device of the type mentioned at the outset which overcomes the disadvantages of the prior art.

In embodiments, an illumination device of the type mentioned at the outset has a control and interface unit and an adjustment unit that is actuatable by the control and interface unit and with which the light carrier is positionally adjustable. Thus, the light cone emitted by the light sources can be changed without manual intervention.

In an advantageous embodiment of the invention, the light source carrier can be pivotally adjustable about at least one pivot axis. As a result, an electronically angle-adjustable homogeneous illumination can be achieved. The direction of the light cone emitted by the light source, in particular the direction of the central axis of this light cone, is also referred to in the context of the present disclosure as the emission direction or emission angle.

Advantageously, the control and interface unit can be designed to control the wavelength and/or the intensity and/or the time course of the activation of at least one of the light sources. As a result, different lighting situations can reproducibly be set. Intensity or wavelength can either be predetermined identically for all light sources of an illumination device, or they can be predetermined differently, for example in order to generate a light intensity and/or wavelength distribution with the available number of light sources.

According to the invention, the control and interface unit can be connected in a further advantageous embodiment of the illumination device to an internal or external sensor, which allows a determination of a current position of the illumination device and/or of the light source carrier in the space. The sensor may be, for example, a position sensor or the like. As a result, an angle of the light cone emitted by the illumination device, for example, can be automatically adapted to a changed position.

Advantageously, the control and interface unit of the illumination devices can be actuated to compensate for a wavelength-dependent change in a radiation angle of the light source. Where applicable, this compensation can take place automatically. By way of example, the control and interface unit can automatically adapt the emission angle of the light source by adjusting the light source carrier if the wavelength of the light source is changed, if a (sometimes only slight) change in the emission angle results in the corresponding configuration.

In an advantageous embodiment, the position of the light source carrier can be regulated by the control and interface unit for setting a defined radiation angle. As a result, the orientation of the illumination can be set, for example, to an angle specified by the user.

In a further advantageous embodiment, the position of the light source carrier may be regulated by the control and interface unit for regulating a fixed or variable default value. This makes it possible to set a position of the illumination angle in real time and track it to a default value.

Advantageously, the position of the light source carrier can be regulated by the control and interface unit taking into account an orientation of the image sensor, whereby, for example, the region illuminated by the illumination device(s) can be moved with the region recorded by the image sensor.

In a further advantageous embodiment of the invention, the position of the light source carrier can be controlled by the control and interface unit as a function of a manufacturing process carried out by an industrial plant. Thus, for example, an adaptation to different batches with different lot sizes can be implemented in a bottling plant.

The position of the light source carrier may preferably be controllable by the control and interface unit as a function of a position of a region to be monitored. The position of the region to be monitored can be defined, for example, by a moving object, for example a workpiece moved in a conveyor or production system, which thus always is in an optimally illuminated position.

In a further advantageous embodiment, the control and interface unit can be connected to at least one internal or external homogeneity sensor or can be connectable to such via which a current homogeneity of an illumination can be determined. This makes it possible to achieve an automatic homogeneity regulation of an illuminated area by adjusting the angle of the light cone. The detection of the current homogeneity can be done, for example, using a built-in or external area or line sensor.

In an advantageous manner, at least one light source of the illumination device can comprise a light-emitting diode. This allows good controllability and high light output, but the illumination device according to the invention may additionally or alternatively also comprise light sources of another type.

According to another embodiment of the illumination device according to the invention, the control and interface unit may have at least one communication interface for communication with at least one other illumination device and/or a central control unit. As a result, the illumination device on the one hand can be controlled by a central control unit. The central control unit may be, for example, a programmable logic controller (PLC) or a computer. The communication interface can be, for example, a bus interface with an industrial bus system. However, other connections, such as an Ethernet or WLAN connection, are also conceivable. On the other hand, the illumination device could also be designed autonomously, i.e. without a wired power supply and communication connection. The power supply could in this case be made inductively and/or the illumination device could be provided with a battery in order to be completely independent of all physical connections. In this context, it would also be possible to use the illumination device in regions in which no communication connection to a central control unit is possible or desired, wherein the control and interface unit in this case can be designed so that it can autonomously handle the full control of the functionalities of the illumination device.

In some cases, the control and interface unit of the illumination device can have at least one further communication interface to which further illumination devices dependent on this illumination device can be connected. These illumination devices dependent on the first illumination device (also referred to herein as the "master illumination device") may be referred to as slave illumination devices. The slave illumination device only needs a communication interface for communicating with the master illumination device. Through this communication interface, it may be possible, for example, to connect a plurality of slave illumination devices, for example in the manner of a daisy-chain connection, in a star topology or another topology with one or more nodes to a single master illumination device. Illumination devices provided as masters and illumination devices provided as slaves may thus be constructed differently with respect to the control and interface unit. However, it is also possible to provide all the necessary communication interfaces and hardware elements in an illumination device, so that the illumination device can be used both as a master and as a slave illumination device.

Examples of corresponding illumination arrangements are disclosed in the document AT 518823 A1 of the present applicant, and it is assumed that a person skilled in the art knows the teachings of this document and can apply them on his own to the present application.

In a further aspect, the present invention relates to a modular lighting system which has at least one illumination device of the type described above that is connected via at least one communication infrastructure to at least one further illumination device of the type described above. Thus, a plurality of illumination devices according to the invention can be assembled into a modular lighting system. Corresponding illumination devices and modular lighting systems can be used as an extension to corresponding image sensors, in particular of machine vision cameras (MV cameras). Due to the possibility of central control of the lighting unit (or all lighting units of a corresponding modular lighting system), light and dark fields can be generated continuously for example.

In the context of the present description, "communication infrastructure" refers to any data connections and interfaces via which data transmission between two illumination devices or between an illumination device and another unit, such as a central control unit, can be realized. Examples include bus systems, preferably industrial bus systems, but also packet-switched data transmission structures, such as wired or wireless packet-switched data networks, in particular LAN and WLAN networks or the like.

In connection with modern industrial plants, bus systems can be used as the communication infrastructure with which other field devices are also connected to one another and/or to one or more superordinate control unit(s). Examples of such industrial bus systems include, but are not limited to, the systems referred to as Profibus® PA, Foundation Fieldbus® or HART®. Normally, the superordinate control unit is a control system or a unit of the central control unit type previously specified in detail. The superordinate control unit can also be used for process control, process visualization, process monitoring and for the commissioning and operation of the field devices. Programs run autonomously on superordinate control units include, for example, the FieldCare operating tool of the Endress+Hauser company group, the Pactware operating tool, the AMS operating tool from Fisher-Rosemount or the PDM operating tool from Siemens. Operating tools integrated into control system applications include Siemens' PCS7, ABB's Symphony and Emerson's Delta V.

In the context of the present disclosure, "field devices" are all technical units integrated in the field of automation technology which may be provided in an industrial plant, in particular actuators (control elements, valves, robots, etc.), sensors and lighting units.

The integration of field devices in configuration or management systems or superordinate control units is accomplished via device descriptions, which ensure that the superordinate units can recognize and interpret the information provided by the field devices. The device descriptions for each field device type or for each field device type in different applications are provided by the respective device manufacturer. In order for the field devices to be integrated into different fieldbus systems, different device descriptions have to be created for the different fieldbuses. So there are—to name just a few examples—HART, Fieldbus Foundation and Profibus device descriptions.

In order to create a uniform description for the field devices, the Fieldbus Foundation (FF), the HART Communication Foundation (HCF) and the Profibus User Organization (PNO) have created a uniform electronic device description (EDD). The EDD is defined in the standard IEC 61804-2. The bus communication device has an integrated bus control and power supply device. As a result, both electrical power in the form of direct current and digital signals can be transmitted on a common bus line. This is a fieldbus system.

The simultaneous transmission of data signals via power supply lines is also known in LAN networks, for example in households via so-called power-line adapters.

It is assumed that the systems described herein and optionally designated by their common trademarks, as well as similar systems, are known to a person skilled in the art, and that an implementation of these systems in the context of the present invention is within the capability of a person skilled in the art. All systems, specifications, standards and norms mentioned herein each refer to the version valid at the time of priority of the present application.

In the modular lighting system according to the invention, at least one first illumination device may advantageously be provided as a master illumination device, wherein at least one further illumination device may be provided as a slave illumination device dependent on this master illumination device. This allows central control of a plurality of illumination devices via the master illumination device(s). The number of master and slave illumination devices is not limited, that is, multi-master systems can also be used in which a plurality of illumination devices handle master functions. In some cases, systems without a defined master-slave hierarchy can be used, such as two parallel lighting systems which each have the same permissions.

According to a further advantageous embodiment, two or more slave illumination devices that may preferably be connected in the form of a daisy-chain arrangement to the master illumination device may be provided in the modular lighting system. This allows central control of the entire modular lighting system via the master illumination device.

Furthermore, the invention relates to an image acquisition system for use in a machine vision system, in particular in an industrial image processing system, comprising at least one image sensor and at least one illumination device according to the invention and/or a modular lighting system according to the invention.

Other exemplary embodiments and advantages of the present invention may be ascertained by reviewing the present disclosure and the accompanying drawing.

BRIEF DESCRIPTION OF THE DRAWINGS

In the following, the present invention is described in detail with reference to FIGS. 1 to 8 which, by way of example, show schematic and non-limiting advantageous embodiments of the invention. In the drawings

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
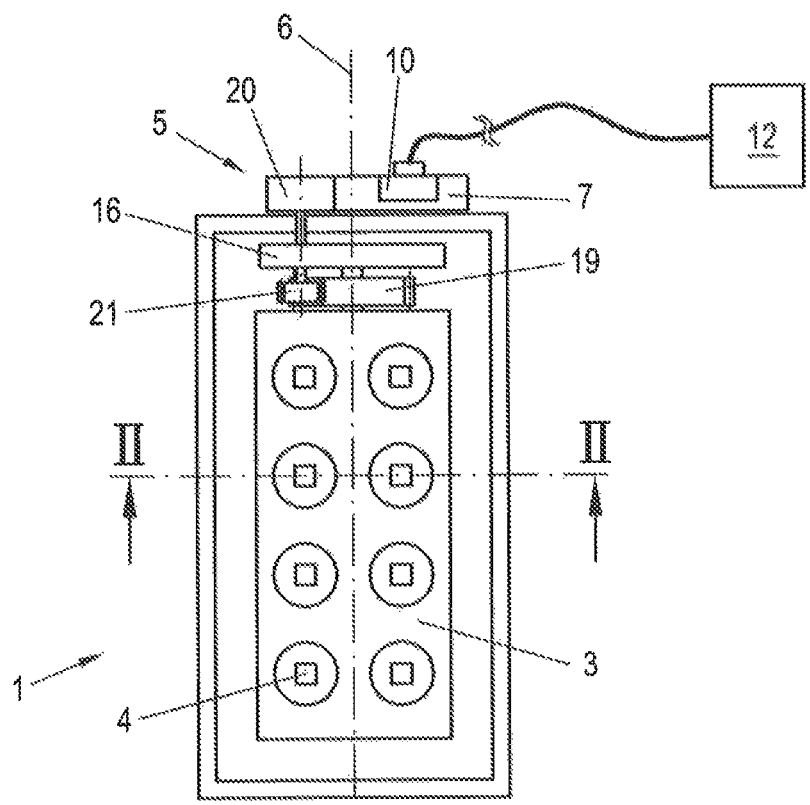
FIG. 1 shows an illumination device according to the invention in a perspective view.
Figure 2:
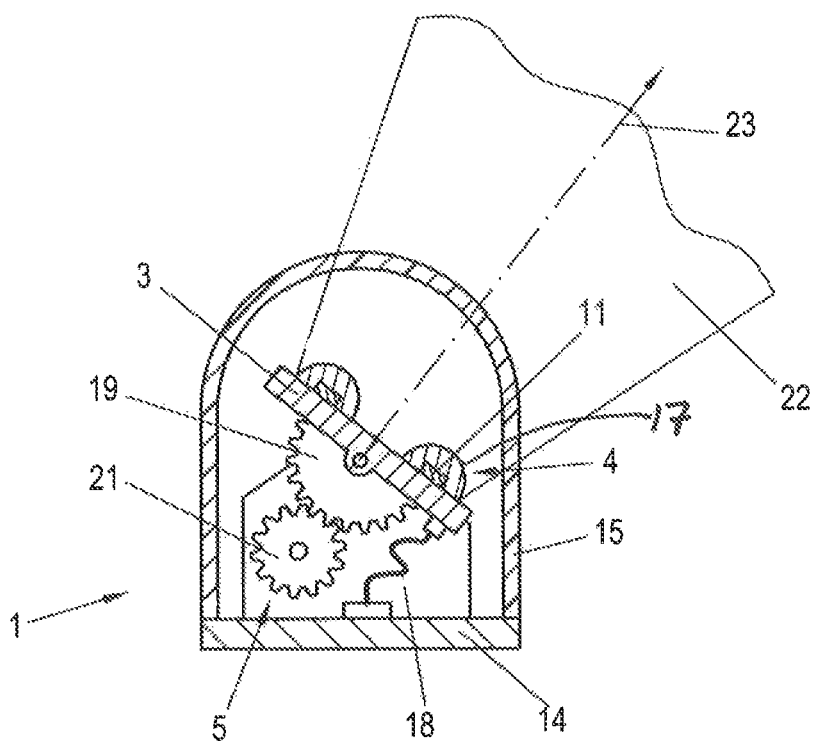
FIG. 2 shows the illumination device in a sectional view along the line II-II of FIG. 1.

In FIGS. 1 and 2, an illumination device 1 according to the invention is shown once in a plan view and once in a sectional view. The illumination device 1 has a base 14 and a translucent cover 15 arranged thereon, which serve as a housing. On the base 14, a bracket 16 is arranged, on which a light source carrier 3 is arranged pivotably about a pivot axis 6. The light source carriers 3 of the embodiments shown in the figures are each pivotable about only a single pivot axis, but one or more other pivot axes can be provided with little effort and in some cases also a translational displacement of the pivot axis (or the light source carrier) can be provided. The implementation of such alternatives are within the capability of a person skilled in the art.

In the context of the present disclosure, "translucent" refers to all materials that have the ability to pass through a portion of light spectrum. In this context, the "spectrum of light" refers both to the spectrum which is visible to humans, and also to the ranges of light adjacent to this range, in particular the infrared and ultraviolet ranges. In the narrower sense, the term "translucent" refers to at least one wavelength range that can be emitted by the respective light sources. The term "translucent" as a generic term comprises in particular the terms "opaque," "clear," "transparent," "translucent," "sheer," etc.

The surfaces of the translucent cover 15 may be substantially smooth or textured. The cover 15 may be designed, for example, in the form of a dome housing. Optionally, the cover 15 may have wholly or partially light-scattering properties, such as to produce a diffused light. The cover 15 may optionally be provided with one or more films, which influence the light transmission, wherein the films may optionally have phototechnical structures. Such features of the cover 15 make it possible—in addition to the actual protective function—to also integrate additional advantageous functionalities, such as properties that are advantageous for photographic applications. The light source carrier 3 is formed as an elongated plate, on the surface of which directed toward the cover 15 a plurality of light sources 4 is arranged. In the illustrated exemplary arrangement, eight light sources 4 are arranged in two parallel rows on the light source carrier, but also significantly more or less light sources 4 may be provided, wherein the light sources 4 can be provided in one or more rows in the manner of a bar light or else in another, for example, annular, arrangement. Each light source 4 has a light-emitting diode 11 which is surrounded by a lens body 17. Such an arrangement is known for example from the field of high-power LEDs and need not be explained in detail here. In some cases, other types of light sources may be used.

The light sources 4 are arranged on the light source carrier 3 and (detachably or non-detachably) attached thereto in a defined position and orientation, wherein the light generated by the light sources 4 is usually emitted in the form of a light cone 22. The center of the light cone 22 defines an emission direction 23, which in the case shown is oriented substantially normal to the surface of the light source carrier 3. The emission direction 23 can be changed by pivoting the light source carrier 3.

The light source carrier 3 can be produced, for example, in the form of a printed circuit board, in which the electrical lines are integrated into the light sources 4. The printed circuit board can have a connection for a connection cable 18 on the rear side facing away from the light sources 3 and which connects the lines of the light source carrier 3 to the other electronic components of the illumination device 1. The connecting cable 18 is flexible enough to allow pivoting of the light source carrier 3 to the full extent and can be implemented, for example, as a known ribbon cable.

On the light source carrier 3, a gear 19 is fixed, which is engaged with a pinion 21 operated by a drive unit 20. The unit of drive unit 20, pinion 21 and gear 19 forms an adjustment unit 5, with which the light source carrier 3 can be pivoted about the pivot axis 6. The drive unit 20 can be, for example, a stepper motor in the illustrated embodiment, but the invention is not limited to the use of rotary motors; rather, linear motors, piezoelectric elements or any other actuators may also be used which allow an electronically actuated angle adjustment (and possibly also linear shifting) of the light source carrier. Examples of such alternative adjustment units 5 also include, for example, films which bend when a certain voltage is applied, thereby achieving an angle change.

The adjustment unit 5 is controlled by a control and interface unit 7. In FIGS. 1 and 2, the control and interface unit 7 and the drive unit 20 are arranged outside of the housing defined by the base 14 and the cover 15, but they may also be located within the housing or be protected in a separate housing. The control and interface unit 7 has a communication interface 10 via which the control and interface unit 7 is connected to a central control unit 12. Alternatively or additionally, the control and interface unit 7 may have a communication interface 10, which allows a connection with a further illumination device 1. The control and interface unit 7 can be designed, for example, as a microcontroller or as a field programmable gate array (FPGA).

Figure 3:
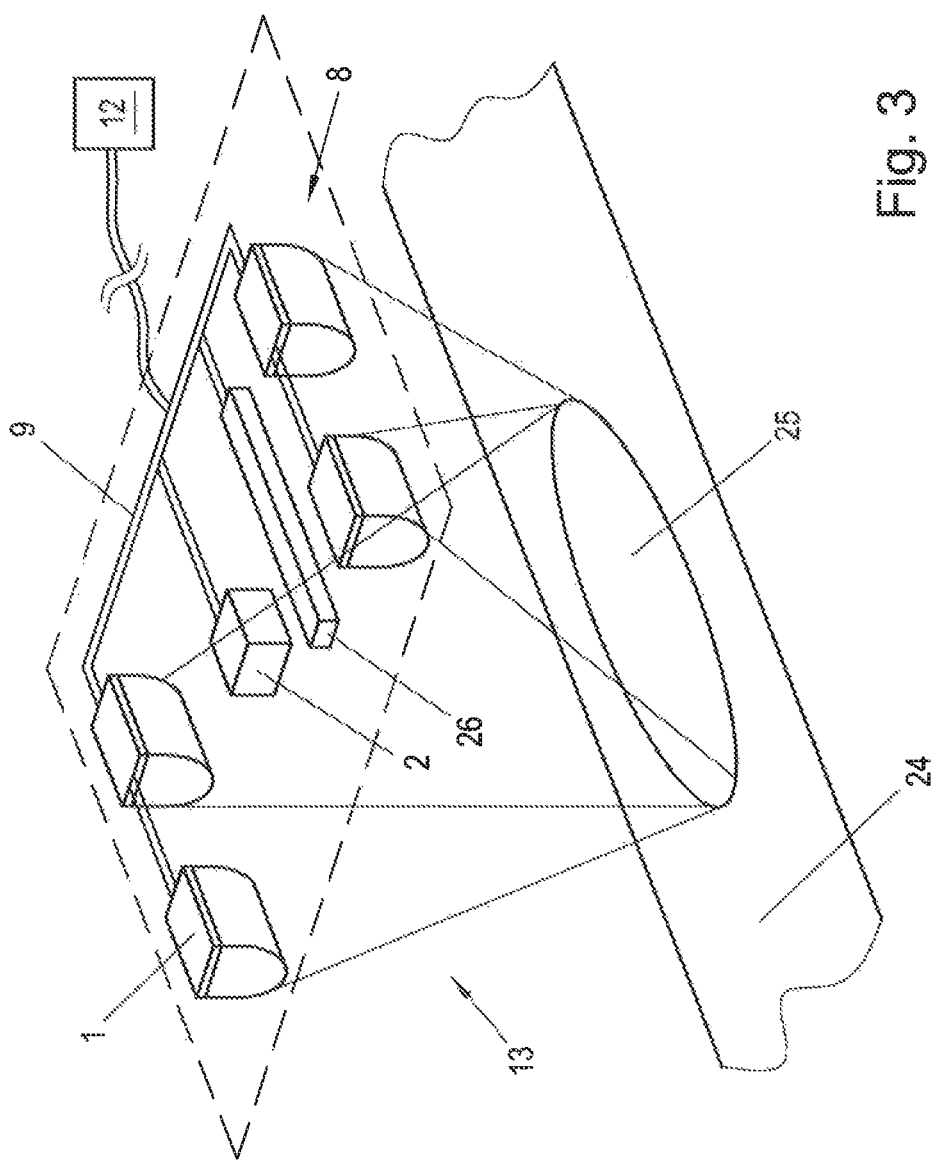
FIG. 3 shows an exemplary image capture system in a perspective view.

The illumination device 1 can be fixed, for example, with the base 14 at a fixed position in the vicinity of a region of a system to be illuminated. Since the illumination device 1 can be controlled by the central control unit 12, it is possible to synchronize the lighting with an MV camera. Optionally, the illumination device 1 can also be fastened to a moving element of a system, wherein an automatic adjustment of the angle of the light cone can be carried out by detecting the current position in the space with the aid of a built-in or external sensor system (e.g. of a position sensor). The illumination device 1 may also be connected to or else contain other sensors. For example, the homogeneity of the illumination of an area illuminated by the illumination device 1 can be determined using an external sensor (e.g. the homogeneity sensor 26 shown in FIG. 3, which can be configured, for example, as an area or line sensor). By adjusting the angle of the cone of light, an automatic homogeneity regulation of the illuminated area can be implemented.

Also, changes in homogeneity caused by wavelength-dependent refractions of the optics can be automatically compensated for by the adjustment of the angle controlled by the control and interface unit 7 or by the central control unit 12.

Thus, it is possible with the illumination device 1 to adjust the exposure angle to an object reproducibly and with high angular accuracy. Both light and dark fields can be generated virtually continuously. The homogeneity of the illuminated area can be automatically optimized by means of a built-in or external area or line sensor.

Due to the modular construction of the illumination device 1, these advantages can be realized not only for a single illumination device 1, but they can also be used for a group of such illumination devices 1. Such a group is referred to in connection with the present disclosure as a modular lighting system 8 and is exemplified in FIG. 3. The modular lighting system 8 of FIG. 3 comprises four illumination devices 1, which are each arranged parallel to one another on two sides of an image sensor 2 on a common base surface. The image sensor 2, the illumination device 1 and a central control unit 12 shown only schematically in FIG. 3 communicate with one another via a communication infrastructure 9. The communication infrastructure 9 is shown purely schematically and by way of example, and represents by way of example all variants of communication connections that are known to a person skilled in the art for these purposes.

The unit of illumination devices 1, image sensor 2 and communication infrastructure 9 is referred to as an imaging system 13 in the context of the present disclosure. The image sensor 2 can be, for example, an MV camera, which is aligned with a region 25 to be monitored of an industrial plant 24. By adjusting the radiation directions or radiation angles of the individual illumination devices 1, the homogeneity of the illumination of the region 25 to be monitored can be optimized. The homogeneity can be determined via the homogeneity sensor 26, which is indicated only schematically in FIG. 3. Optionally, the homogeneity sensor 26 may also be provided in the area of the region to be monitored 25, for example integrated in a surface of the plant 24.

The illumination devices 1 can be controlled in angle and exposure synchronization substantially in real time. The settings of the respective application can be saved and recalled as required (e.g. in the case of a repetitive batch change). Furthermore, both the homogeneity of the illuminated area and the exposure time and the wavelength (predetermined selection from different wavelengths) can be adjusted virtually as desired.

According to the invention, it is possible to create modular lighting systems 8 with different combinations and configurations of illumination devices 1, each optimized for the intended lighting purpose. Several configurations are shown by way of example in FIGS. 4 to 6.

Figure 4:
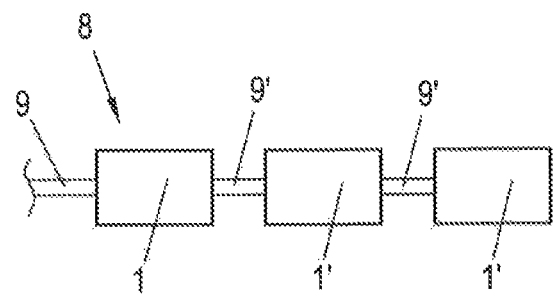
FIGS. 4 to 6 show a plurality of exemplary configurations of a modular lighting system according to the invention.

FIG. 4 shows an example of a modular lighting system 8, which comprises a linear arrangement of three illumination devices 1, 1', wherein a first illumination device 1 is connected via a first communication infrastructure 9, for example an industrial bus system, to a central control unit 12 (not shown in FIG. 4). The first illumination device 1 is designed as a master illumination device, i.e. it has a communication interface with the first communication infrastructure 9 and a further communication interface with another communication infrastructure 9', on which two slave illumination devices 1' are arranged in a serial arrangement.

Figure 5:
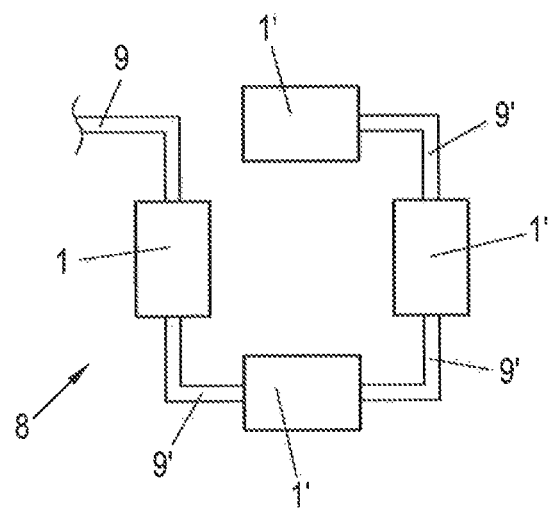

FIG. 5 shows a further example of a modular lighting system 8 comprising a rectangular arrangement of four illumination devices 1, 1'. Here again, a master illumination device 1 is connected via a first communication infrastructure 9 to a central control unit 12 and the other three illumination devices 1' are provided via a further communication infrastructure 9' as slave illumination devices 1'.

Figure 6:
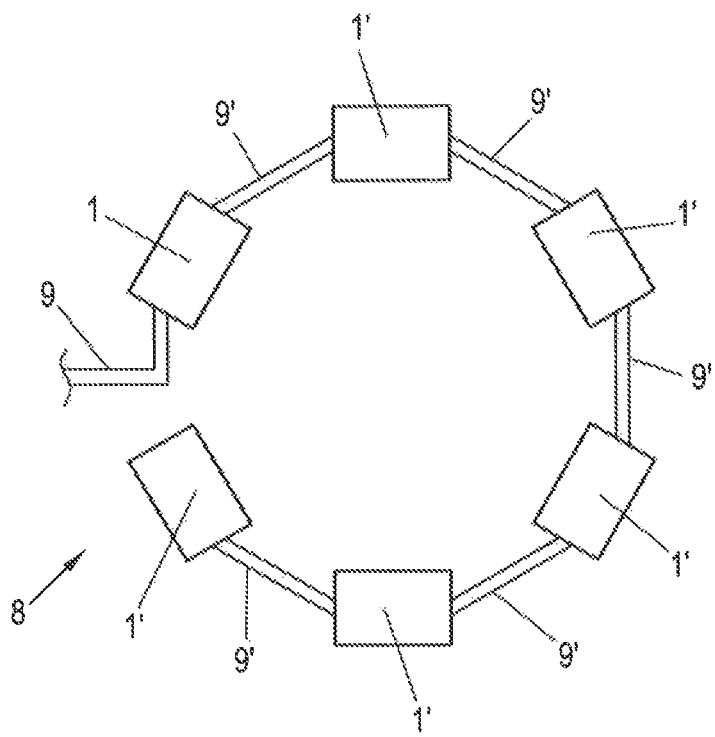

Similarly, a plurality of illumination devices 1 may for example be provided in a substantially annular arrangement, as shown for example in the hexagonal arrangement shown in FIG. 6. In an analogous manner, modular lighting systems with numerous illumination devices 1 can be realized. In order to achieve better homogeneity, the modular lighting system may also have an odd number of illumination devices and/or the illumination devices may be arranged regularly or irregularly distributed.

The modular lighting systems 8 shown in FIGS. 4 to 6 are all aligned in one plane, which makes it possible to fasten the individual illumination devices 1, for example, on a common mounting plate. However, it is also possible to arrange different illumination devices 1 of a modular lighting system 8 in different positions distributed in the space if this is desired for the respective application.

Using the above-described modular lighting systems 8, the radiation direction of each individual illumination device 1 can be adjusted via the respective adjustment unit 5. In this case, the control and interface unit 7 of the master illumination device 1 receives the control signals transmitted via the communication infrastructure 9 from the central control unit 12, which in some cases are forwarded from a gateway provided in the master illumination device 1 via the further communication infrastructure 9' to the respective slave illumination devices 1'. Thus, both the exposure parameters, such as the wavelength, the exposure period or the point in time of the exposure), as well as the respective radiation angle of the illumination devices 1, 1' can be controlled independently of each other. Optimal adjustment of the individual radiation angles is essential for the homogeneity of the illumination.

By the coordinated adjustment of the radiation angle of the individual illumination devices 1 to each other, the homogeneity of the region to be illuminated can also be selectively varied. When using a homogeneity sensor 26, the current homogeneity of the illuminated area can be determined in order to automatically generate the optimum homogeneity for the desired field of application in a further step.

In practice, an image acquisition system 13 according to the invention can be operated, for example, according to the procedure described below. According to the desired application, the radiation angles of the individual illumination devices 1 are set to produce the desired light or dark field. Before the image sensor 2 generates a picture, the corresponding exposure parameters (wavelength, exposure period, point in time of the exposure) of the master illumination device 1 are set. If additional slave lighting is integrated, it will be configured via the master lighting. Via a user interface, which may be designed, for example, as a graphical user interface (GUI), all the data to be diagnosed, such as the temperature or light intensity, as well as the set parameters can be displayed for checking. When the image sensor 2 is triggered, a time-synchronized flash of light with the set parameters is then generated by the modular lighting system 8.

Figure 7:
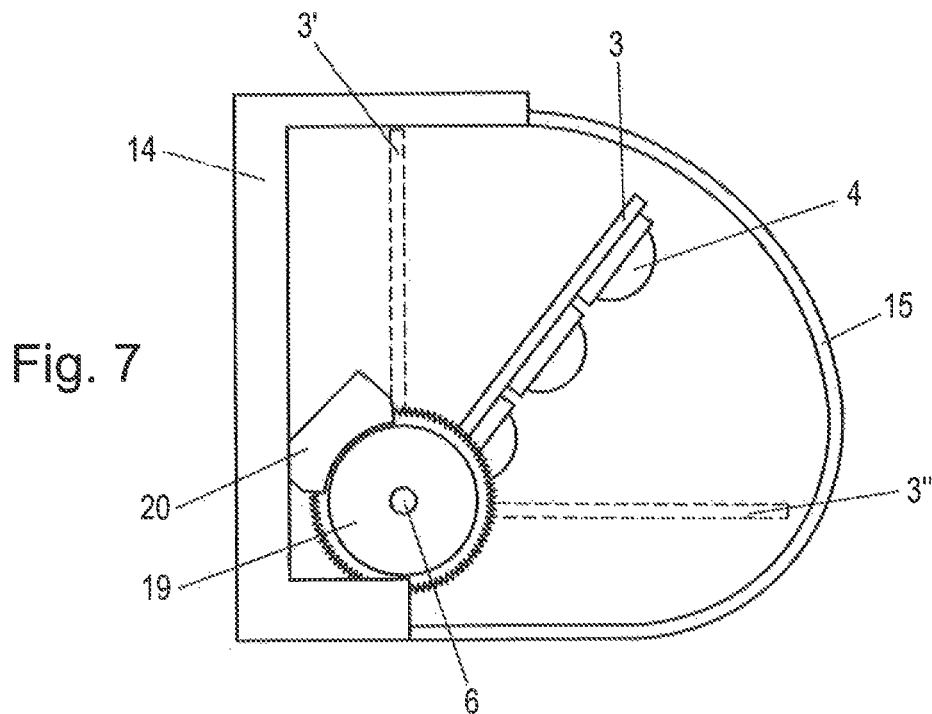
FIG. 7 shows a further embodiment of the illumination device according to the invention in a side view.
Figure 8:
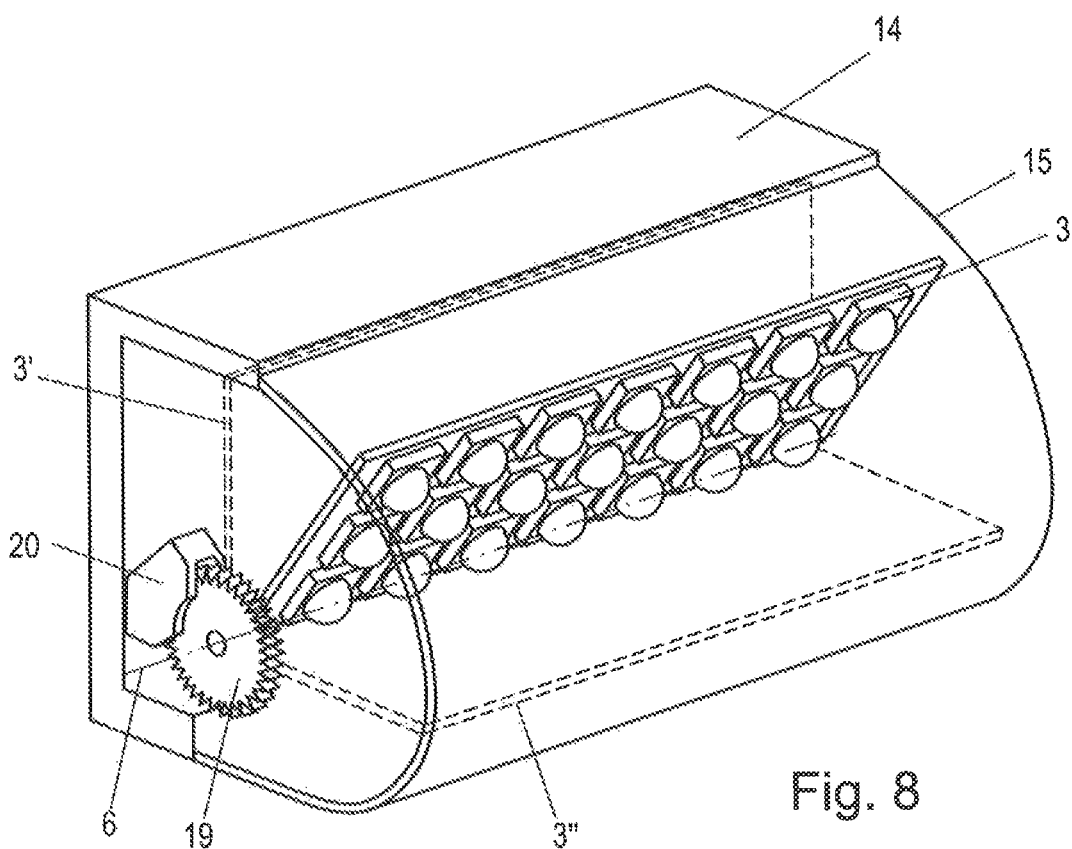
FIG. 8, shows the illumination device of FIG. 7 in a perspective view.

FIGS. 7 and 8 show a further embodiment of an illumination device 1 according to the invention which is particularly suitable, for example, for mounting on a vertical surface. For analog components, the same designations and reference numerals used in the previous description are used below. The illumination device 1 in turn comprises a housing with a base 14 and a translucent cover 15. A plurality of light sources 4 is in turn arranged on a rectangular light source carrier 3. The light source carrier 3 can be pivoted about a pivot axis 6, which, however, extends on a longitudinal side of the light source carrier 3, wherein a gear wheel 19 fixed to the light source carrier 3 is actuated by a drive unit 20 fastened to the base. The light source carrier can be adjusted between a position 3' substantially parallel to the base 14 and a position 3" projecting substantially normal to the base 14 into any intermediate angular position.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE NUMERALS

Illumination device 1
Image sensor 2
Light source carrier 3
Light source 4
Adjustment unit 5
Pivot axis 6
Control and interface unit 7
Modular lighting system 8
Communication infrastructure 9
Communication interface 10
LED 11
Central control unit 12
Image acquisition system 13
Base 14
Cover 15
Bracket 16
Lens body 17
Connection cable 18
Gear wheel 19
Drive unit 20
Pinion 21
Light cone 22
Emission direction 23
Industrial plant 24
Region to be monitored 25
Homogeneity sensor 26

What is claimed:

1. An image acquisition system comprising:
   a multitude of illuminating devices for illuminating a region of an industrial plant to be monitored by at least one image sensor, wherein the illuminating devices comprise:
      at least one light source;
      at least one light source carrier with the at least one light source arranged thereon;
      a light source control and interface unit comprising at least one of a microprocessor or a field programmable gate array; and
      an adjusting unit, which is actuatable by the light source control and interface unit, being configured to positionally adjust the at least one light source carrier to illuminate the region to be monitored,
   wherein the at least one image sensor comprises a machine vision camera that is oriented toward the region in the industrial plant to be monitored, in which an object within the region in the industrial plant is illuminated; and a homogeneity sensor from which homogeneity of the illumination is derived, and the homogeneity of the illumination is optimizable by adjusting radiation angles of individual illumination devices over the region to be monitored.

2. The image acquisition system according to claim 1, wherein the light source carrier is at least one of pivotable about at least one pivot axis or translationally displaceable along a path, so that an electronically angle-adjustable homogeneous illumination is achievable.

3. The image acquisition system according to claim 1, wherein the light source control and interface unit is designed to control at least one of a wavelength or an intensity or a time course of activation of at least one of the light sources.

4. The image acquisition system according to claim 1, wherein the light source control and interface unit is connected to an internal or external sensor which permits a detection of a current position of at least one of the illumination device or the light source carrier in a room, in order to automatically adjust an angle of the light cone emitted by the at least one of the illumination devices to a changed position.

5. The image acquisition system according to claim 1, wherein the light source control and interface unit is actuatable to compensate for a wavelength-dependent change in a radiation angle of the light source.

6. The image acquisition system according to claim 1, wherein at least one of the position of the light source carrier is regulatable by the control and interface unit for setting a defined radiation angle, or the position of the light source carrier is regulatable by the light source control and interface unit for regulating a fixed or variable default value.

7. The image acquisition system according to claim 1, wherein the position of the at least one light source carrier is regulatable by the light source control and interface unit as at least one of a function of a manufacturing process carried out by the industrial plant or as a function of a position of the region monitored by the machine vision camera.

8. The image acquisition system according to claim 1, further comprising at least one internal or external homogeneity sensor, wherein the control and interface unit is one of connected to the at least one internal or external homogeneity sensor or connectable to the at least one internal or external homogeneity sensor, via which a current homogeneity of illumination is determinable.

9. The image acquisition system according to claim 1, wherein the at least one light source comprises a light-emitting diode.

10. The image acquisition system according to claim 1, wherein the light source control and interface unit has at least one communication interface for communicating with at least one of at least one other illumination device or a central control unit.

11. The image acquisition system according to claim 1, wherein at least one of the illumination devices is provided as a mater illumination device, wherein at least one of the illumination devices is provided as a slave illumination dependent of the mater illumination device.

12. The image acquisition system according to claim 1, wherein the illumination devices comprises two or more further illumination devices configured as two or more slave illumination devices.

13. The image acquisition system according to claim 1, wherein the image sensor, the multitude of illuminating devices and a central control unit communicate with one another via a communication infrastructure.

14. The image acquisition system according to claim 1, wherein the homogeneity sensor comprises a built-in or external area or line sensor.

15. The image acquisition system according to claim 1, wherein changes in homogeneity caused by wavelength-dependent refractions of the optics are automatically compensated for by the adjustment of the angle controlled by the control and interface unit or by the central control unit.

16. The image acquisition system according to claim 13, wherein the multitude of illumination devices comprise two or more slave illumination devices connected to a master illumination device in one of a daisy-chain arrangement or a star topology.

17. The image acquisition system according to claim 13, wherein the homogeneity sensor comprises a built-in or external area or line sensor.

18. The image acquisition system according to claim 1, wherein the illuminating devices further comprise a translucent cover, and
wherein the at least one light source carrier is at least one of pivotably movable or translationally movable by the adjusting device relative to the translucent cover.

19. The image acquisition system according to claim 1, wherein the illuminating devices further comprise a base to which the at least one light source is mounted for at least one of pivoting movement or translational movement by the adjusting device relative to the base.

20. The image acquisition system according to claim 1, wherein the illuminating devices further comprise a translucent cover, and
wherein the radiation angles of the individual illumination devices are adjustable relative to the translucent cover.

* * * * *